Patented June 7, 1938

2,119,932

UNITED STATES PATENT OFFICE 2,119,932

PROCESS FOR THE MANUFACTURE OF RUBBER DUST

Martinus Joännes Stam, The Hague, Netherlands

No Drawing. Application August 30, 1935, Serial No. 38,653. In the Netherlands September 5, 1934

3 Claims. (Cl. 18—50)

This invention relates to a new product which might be properly designated as "rubber dust", "latex dust" or the like.

It has been for a long time the object of rubber experts to obtain rubber in the form of a powder in order to avoid the need for heavy machinery in the rubber manufacturing industry.

Many attempts in this direction have been made by which a crumb-like product is obtained by various coagulating methods.

By such methods, however, it is impossible to obtain a fine powder of pure rubber as desired by experts. According to a publication by G. Martin in India Rubber Journal, December 3rd, 1932, in order to obtain the same intimate mixture of rubber and compounding ingredients as is obtained with compounded latex, the rubber powder would probably have to consist of particles of less than 1/1000 inch diameter.

Other attempts to obtain a fine rubber powder have been made by spray drying latex to which glue or haemoglobin have been added. These substances act as protective colloids and dispersing agents and therefore the obtained rubber product may be easily re-dispersed in ammoniacal water into a latex-like liquid; but, by the methods known when the use of these protective colloids was disclosed, no powder of extreme fineness could be obtained.

The first commercial product that may be really called rubber powder was obtained by applicant and this product and the manner by which it is obtained is disclosed in his British Patents No. 388,341 and No. 396,579.

With this product it is indeed possible to obtain nearly the same intimate mixture of rubber and compounding ingredients as is obtained with compounded latex.

The particles of the rubber powder obtained by these and other known methods vary in size but all consist of many elementary globules. The finest powder obtained in this manner has a particle size exceeding 75$\mu$.

Applicant has now found that a still better product may be obtained from latex.

Such a product is a new commercial article of manufacture and it consists of rubber particles substantially of the size of the particles present in natural, preserved or artificial latex. The particles substantially have a size of less than 75$\mu$. In their preferred form the particles are coated by a protective substance which prevents the agglomeration of the particles.

In these documents rubber in the form described is called rubber dust. It is stated here, however, that "rubber" is to be taken in a general sense, so not only rubber in the proper sense is meant, but also substances present in other latices than rubber latex, such as gutta percha, balata and the like.

The diameter of the globules or particles present in latex differs between rather wide limits. The bulk of the rubber has a particle size between 0.1 and 3$\mu$ but also smaller and larger particles are present. The particle size depends also on the age of the tree. In trees of considerable age globules of somewhat larger size are frequent.

Whereas all previous products contain smaller or larger agglomerations of rubber particles, only the new product consists practically of rubber particles of the size in which they exist in latex.

The new product is obtained by sub-dividing latex into particles of substantially the size of the particles present in latex and drying the particles. In a preferred method the particles are coated by a protective substance which prevents agglomeration of the same.

The way in which the latex is sub-divided into particles of the size described is immaterial; it may be done by centrifugal action. In principle it is immaterial too in which way the particles are dried; it has been found advantageous to atomize the latex into a current of drying air.

The protective substance added to the latex may be, for example, dextrine.

It is true that the dry particles again adhere to each other probably due to static electrical forces to a limited extent and form small aggregates which, however, are easily seen under a microscope to be separate particles in the same way as most other finely divided substances.

In this manner, aggregates of a particle size of about 0.1–75$\mu$ may be formed, but these aggregates behave in the same way as the elementary globules and differently from the known rubber powder.

The following example will further illustrate one way of obtaining the rubber dust according to the invention, but the invention is by no means restricted by this example.

Example

A thin film of latex to which a substance has been added capable of forming a protective layer around dried rubber globules which prevents the agglomeration of same, is atomized by a device rotating at 15,000 revolutions per minute having a diameter of 30 cm. or at 9000 revolutions per minute with a device having a diameter of 50 cm. and spraying it in a drying current of air moving at a velocity of 250 metres per second, which carries the droplets away as soon as they are formed, and prevents all agglomeration of droplets until they are perfectly dry.

In this example the small size of the particles formed which substantially is less than 75µ, is due to a combination of a high circumferential velocity of the atomizing device and a high velocity of the current of air.

What I claim is:—

1. Process for the manufacture of rubber dust from latex, comprising adding to latex a substance which prevents agglomeration of dried rubber particles, subdividing said latex entirely into small droplets and discharging these droplets into a current of drying gas of a sufficient velocity to prevent uniting of the droplets before they are dried.

2. Process for the manufacture of rubber dust from latex comprising adding to latex a substance which prevents agglomeration of dried rubber particles, subdividing said latex by centrifugal force into small droplets containing only such a small amount of rubber that the size of the dried droplets is less than 75µ and discharging the droplets into a current of drying air of sufficient velocity to prevent uniting of the droplets before they are dried.

3. Process for the manufacture of rubber dust from latex comprising adding to the latex a substance which prevents agglomeration of dried rubber particles, subdividing said latex by centrifugal discharge from a rotating disc, having a circumferential velocity of about $450,000\pi$ cm. per minute into a current of drying air of sufficient velocity to prevent uniting of the droplets before they are dry.

MARTINUS JOÄNNES STAM.